US012700635B2

(12) United States Patent
Hayashita

(10) Patent No.: US 12,700,635 B2
(45) Date of Patent: Aug. 4, 2026

(54) BATTERY PACK

(71) Applicant: TOYOTA JIDOSHA KABUSHIKI KAISHA, Toyota (JP)

(72) Inventor: Masatoshi Hayashita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 620 days.

(21) Appl. No.: 18/143,899

(22) Filed: May 5, 2023

(65) Prior Publication Data

US 2024/0021938 A1 Jan. 18, 2024

(30) Foreign Application Priority Data

Jul. 13, 2022 (JP) ................................. 2022-112167

(51) Int. Cl.
  *H01M 50/233* (2021.01)
  *B60L 50/64* (2019.01)
  *H01M 50/204* (2021.01)

(52) U.S. Cl.
  CPC .......... *H01M 50/233* (2021.01); *B60L 50/64* (2019.02); *H01M 50/204* (2021.01); *H01M 2220/20* (2013.01)

(58) Field of Classification Search
  None
  See application file for complete search history.

(56) References Cited

U.S. PATENT DOCUMENTS

| | | | | | |
|---|---|---|---|---|---|
| 8,609,274 | B2 * | 12/2013 | Paolazzi | ........... | H01M 10/6557 429/151 |
| 2011/0250492 | A1 * | 10/2011 | Kageyama | ............... | B21J 5/022 429/176 |
| 2012/0070718 | A1 * | 3/2012 | Motohashi | ............ | H01M 50/20 429/156 |
| 2018/0375075 | A1 | 12/2018 | Yoshimura et al. | | |

FOREIGN PATENT DOCUMENTS

JP        2017-111893 A        6/2017

OTHER PUBLICATIONS

Dictionary definition from The Britannica Dictionary for the word "cover" relied upon herein. (Year: 2025).*

* cited by examiner

*Primary Examiner* — Jeffrey T Barton

(74) *Attorney, Agent, or Firm* — Dinsmore & Shohl LLP

(57) ABSTRACT

A battery pack according to the present disclosure is equipped with a battery case that accommodates a plurality of battery cells laminated on one another. The battery case includes a bottom wall that faces bottom surfaces of the battery cells, and four lateral walls that are connected to the bottom wall and that face lateral surfaces of the battery cells respectively. At least one of the four lateral walls includes a central portion that faces the battery cells, and a peripheral portion located around the central portion. The peripheral portion includes a fragile portion that is provided in the shape of a frame in such a manner as to cover the central portion and that is lower in rigidity than the central portion.

9 Claims, 5 Drawing Sheets

COMPARATIVE EXAMPLE

APPLICATION
OF LOAD

COMPARATIVE EXAMPLE

BATTERY PACK

CROSS-REFERENCE TO RELATED APPLICATION

This application claims priority to Japanese Patent Application No. 2022-112167 filed on Jul. 13, 2022, incorporated herein by reference in its entirety.

BACKGROUND

1. Technical Field

The present disclosure relates to a battery pack.

2. Description of Related Art

Japanese Unexamined Patent Application Publication No. 2017-111893 (JP 2017-111893 A) discloses a battery case accommodating a battery stack that is a laminated body of a plurality of battery cells. This battery case has a bottom wall that faces a bottom surface of the battery stack, and four lateral walls that are connected to the bottom wall and that face lateral surfaces of the battery stack respectively.

SUMMARY

When a load is applied to one of the lateral walls of the battery case, the lateral wall deforms from a connection portion connected to the bottom wall. As a result of such deformation of the lateral wall, the load is locally applied to the battery cells.

The present disclosure has been made in view of the foregoing problem. It is an object of the present disclosure to provide a battery pack that can restrain a load from being locally applied to battery cells when the load is applied to one of lateral walls of a battery case.

A battery pack according to the present disclosure is equipped with a battery case that accommodates a plurality of battery cells laminated on one another. The battery case includes a bottom wall that faces bottom surfaces of the battery cells, and four lateral walls that are connected to the bottom wall and that face lateral surfaces of the battery cells respectively. At least one of the four lateral walls includes a central portion that faces the battery cells, and a peripheral portion located around the central portion. The peripheral portion includes a fragile portion that is provided in the shape of a frame in such a manner as to cover the central portion and that is lower in rigidity than the central portion.

The fragile portion may be a recessed portion formed in the shape of the frame.

The fragile portion may be a step portion located between the peripheral portion and the central portion formed to be thicker than the peripheral portion.

The battery pack according to the present disclosure is equipped with the fragile portion, so stress can be concentrated on the fragile portion when a load is applied to one of the lateral walls of the battery case. As a result, the fragile portion provided in the shape of the frame fractures, and a load from the outside acts on the battery pack with a wide range of the lateral wall (i.e., the central portion) in contact with the battery cells. Therefore, the load can be restrained from being locally applied to the battery cells.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
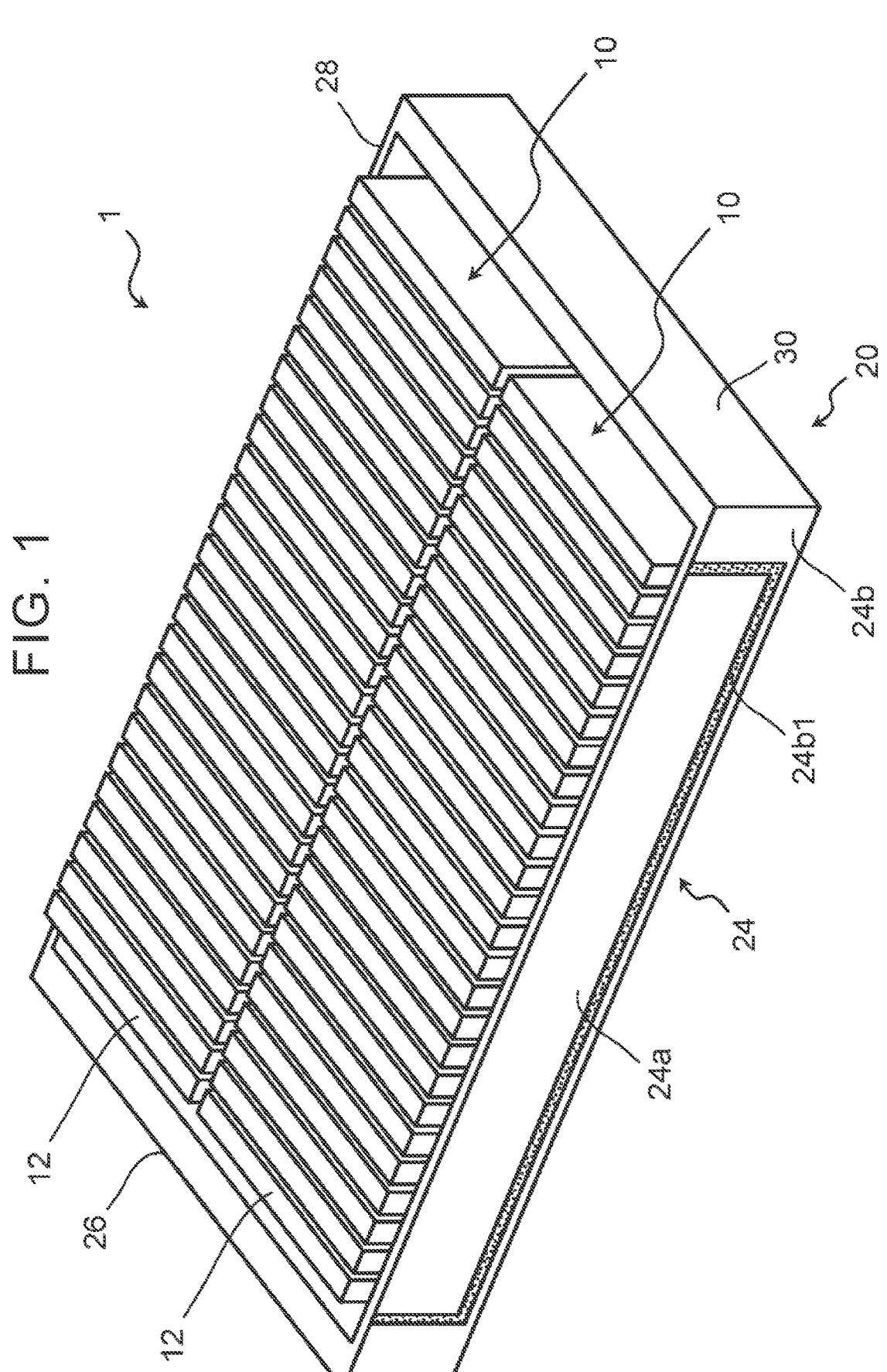
FIG. 1 is a perspective view schematically showing the structure of a battery pack according to one of the embodiments.

A battery pack according to one of the embodiments of the present disclosure will be described hereinafter with reference to the accompanying drawings. Incidentally, like elements are denoted by like reference symbols in the drawings to omit or simplify redundant description.

1. Structure of Battery Pack

Figure 2:
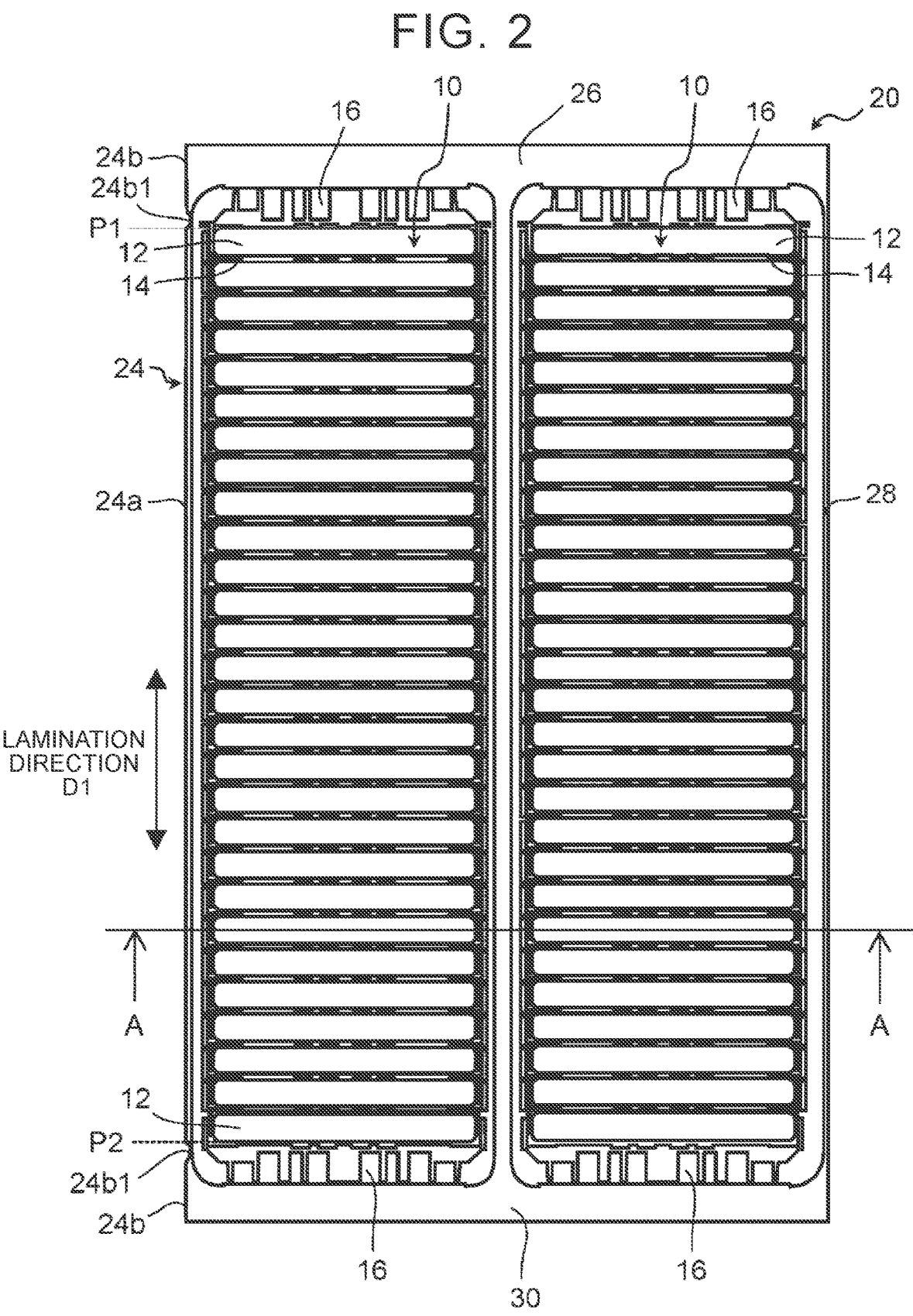
FIG. 2 is a plan view of the battery pack shown in FIG. 1 as viewed from above.

FIG. 1 is a perspective view schematically showing the structure of a battery pack 1 according to the embodiment. FIG. 2 is a plan view of the battery pack 1 shown in FIG. 1 as viewed from above.

The battery pack 1 is equipped with battery stacks 10 each of which is a laminated body of a plurality of battery cells 12, and a battery case 20 that accommodates the battery stacks 10. The battery pack 1 is mounted in an electrified vehicle such as a hybrid electric vehicle (HEV) or a battery electric vehicle (BEV) to supply the electrified vehicle with power.

More specifically, as an example, each of the battery stacks 10 is configured by alternately laminating a plurality of rectangular battery cells 12 and a plurality of spacers 14, and is equipped with a pair of end plates 16 arranged in such a manner as to sandwich an assembly of the battery cells 12 and the spacers 14 from both sides in a lamination direction D1. The spacers 14 are formed of insulating resin, ensure insulation between adjacent ones of the battery cells 12, and function as heat release paths for the battery cells 12. Each of the battery stacks 10 having this configuration is accommodated in a battery case 20, with a compression load applied to each of the battery stacks 10 from the end plate 16 sides at both ends thereof.

Incidentally, in the example of the battery pack 1, the battery stacks 10 are arranged in two rows. However, the battery stacks 10 may be integrated to be arranged in a single row, or divided to be arranged in three or more rows. Besides, in the example of the battery pack 1, the lamination direction D1 of the battery cells 12 is parallel to the longer-side direction of the battery case 20, but may be parallel to the shorter-side direction of the battery case 20.

The battery case 20 is made of, for example, metal, and substantially has the shape of a rectangular parallelepiped. The battery case 20 is constituted of an upper cover (not shown) constituting an upper wall of the battery case 20, and a lower case. The lower case constitutes a bottom wall 22

(see FIG. 3), and four lateral walls 24, 26, 28, and 30. The bottom wall 22 faces bottom surfaces of the battery stacks 10 (the respective battery cells 12). The four lateral walls 24 to 30 are connected to the bottom wall 22, and face lateral surfaces of the battery stacks 10 respectively. In FIG. 1 and FIG. 2, the lower case is depicted as the battery case 20. That is, the lower case substantially has the shape of a rectangular parallelepiped that is open on an upper surface thereof.

Figure 3:
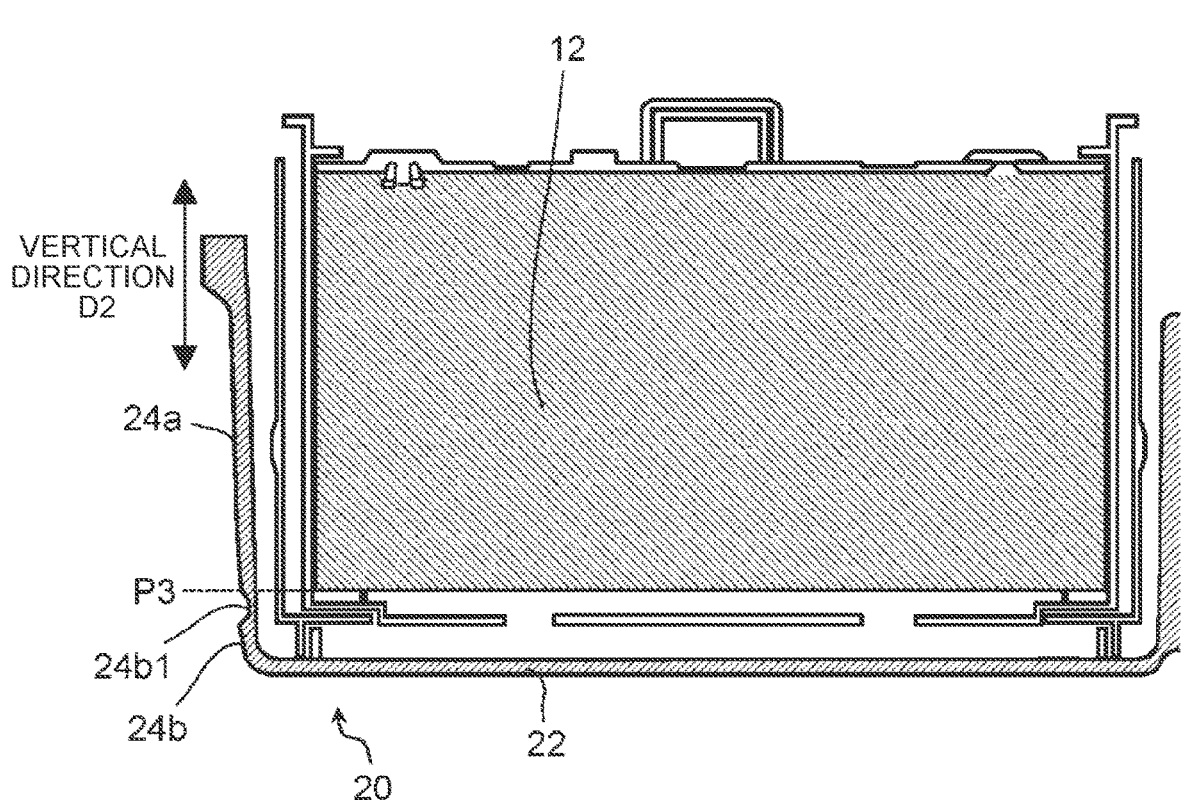
FIG. 3 is a cross-sectional view taken along a line A-A in FIG. 2.
Figure 4:
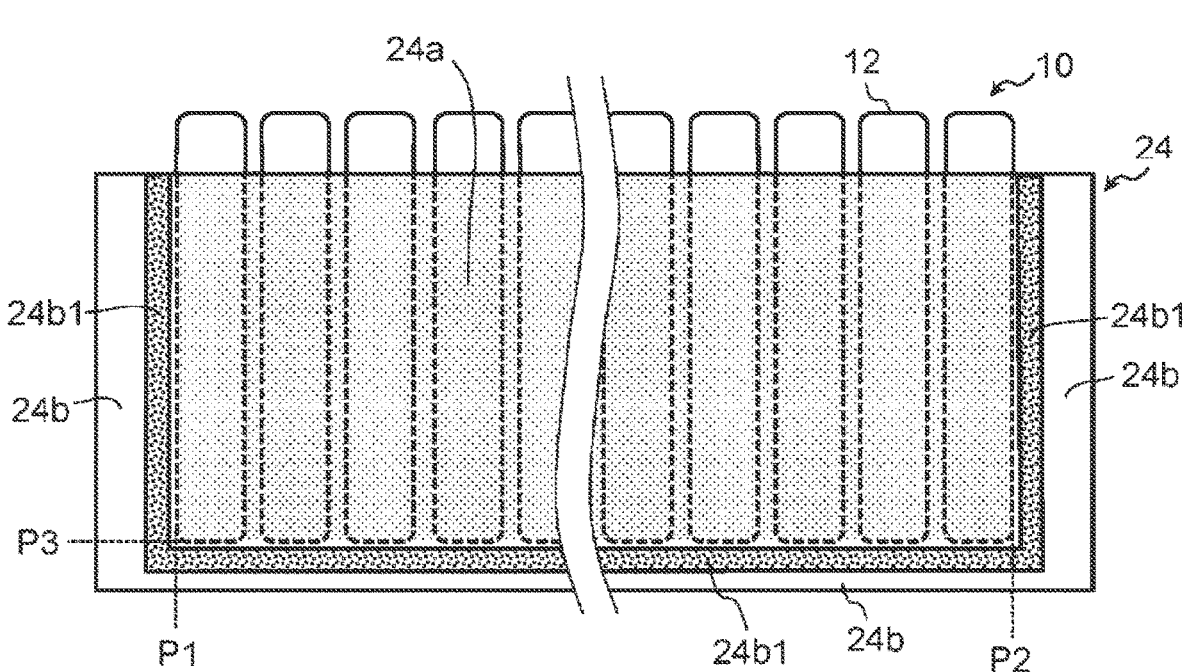
FIG. 4 is a schematic lateral view of the battery case shown in FIG. 1 as viewed from a lateral wall side.

Next, the configuration of the battery case 20 (the lower case) will be described with reference to FIG. 3 and FIG. 4 as well as FIG. 1 and FIG. 2. FIG. 3 is a cross-sectional view along a line A-A in FIG. 2, and is a cross-sectional view of one of the battery cells 12 and the battery case 20 as viewed from a direction perpendicular to the lamination direction D1. In FIG. 3, the configuration around that one of the two-row battery stacks 10 which is located closer to the lateral wall 24 is depicted, whereas the configuration around the other battery stack 10 is not depicted. FIG. 4 is a schematic lateral view of the battery case 20 shown in FIG. 1 as viewed from the lateral wall 24 side.

The lateral wall 24 of the battery case 20 is one of the lateral walls extending along the lamination direction D1. As shown in FIG. 4 and the like, the lateral wall 24 includes a central portion 24a (a general surface) facing the battery stack 10, and a peripheral portion 24b located around the central portion 24a. More specifically, in a lateral view of the battery case 20 as viewed from the lateral wall 24 side (see FIG. 4), the central portion 24a mentioned herein corresponds to a central region of the lateral wall 24 that overlaps with the battery cells 12 constituting the battery stack 10. Furthermore, the peripheral portion 24b is a region of the lateral wall 24 other than the central portion 24a.

In addition, as shown in FIG. 4, the peripheral portion 24b includes a fragile portion 24b1 provided in the shape of a frame in such a manner as to cover the central portion 24a. The fragile portion 24b1 is a region that is lower in rigidity than the central portion 24a.

In concrete terms, the fragile portion 24b1 is a recessed portion formed in the shape of a frame (more specifically, the shape of the letter "U") in such a manner as to cover the central portion 24a. In other words, the fragile portion 24b1 is formed in the shape of a groove in an outer surface of the lateral wall 24. In addition, the fragile portion 24b1 is a reduced thickness portion that is smaller in thickness than the periphery of the fragile portion 24b1. Therefore, the fragile portion 24b1 is a region that is lower in rigidity than a region of the peripheral portion 24b other than the fragile portion 24b1 as well as the central portion 24a. Incidentally, the fragile portion 24b1 that is the recessed portion may be formed in an inner surface of the lateral wall 24.

More specifically, when the lateral wall 24 is viewed from above as shown in FIG. 2, the fragile portion 24b1 is located more outwardly of the lateral wall 24 in the lamination direction D1 than outer end positions P1 and P2 of the battery cells 12 located at ends in the lamination direction D1 respectively, and extends along a vertical direction D2 (see FIG. 3) of the battery case 20. That is, the fragile portion 24b1 is provided in the peripheral portion 24b in the vicinity of both the lateral walls 26 and 30 adjacent to the lateral wall 24. Besides, when the lateral wall 24 is viewed from the direction perpendicular to the lamination direction D1 as shown in FIG. 3, the fragile portion 24b1 is located further below the lateral wall 24 than a lower end position P3 of the battery cell 12 in the vertical direction D2, and extends along the lamination direction D1. That is, the fragile portion 24b1 is provided in the peripheral portion 24b in the vicinity of the bottom wall 22.

2. Effects

Figure 5A:
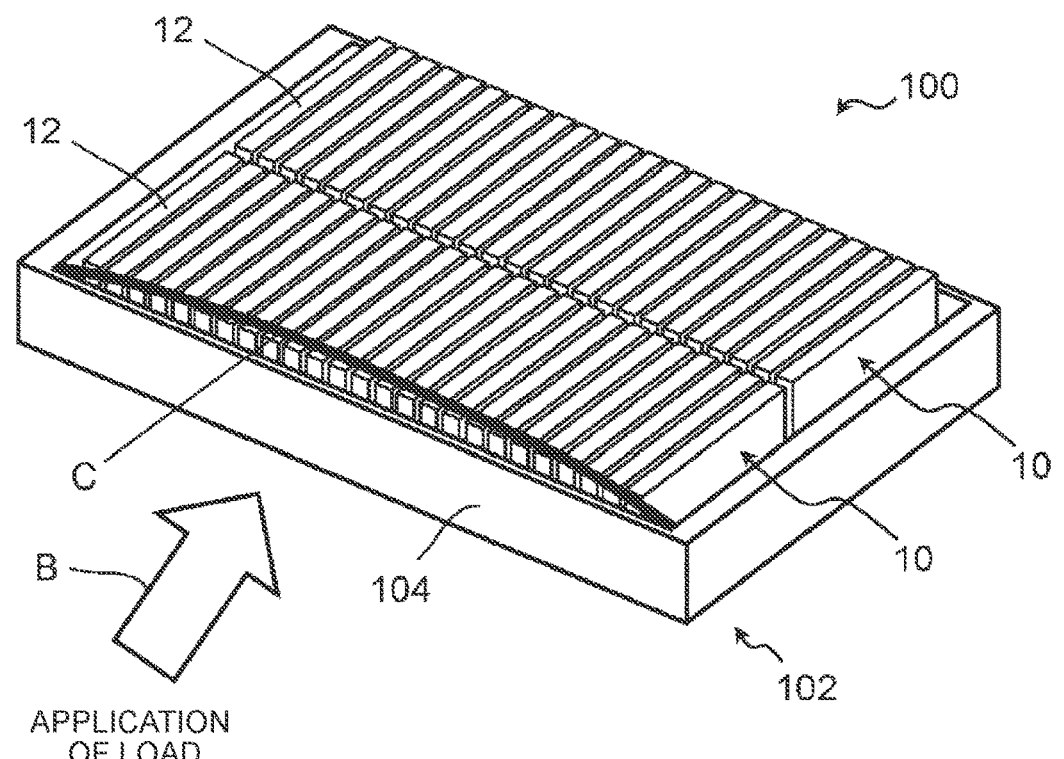
FIG. 5A is a view for illustrating a problem of a battery pack according to a comparative example.
Figure 5B:
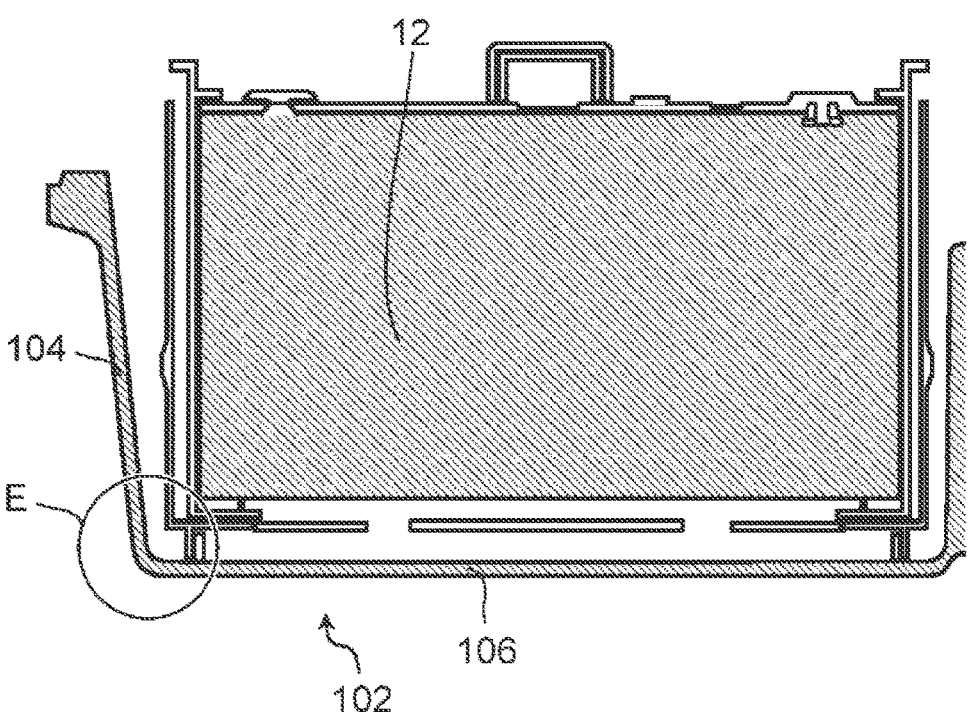
FIG. 5B is another view for illustrating the problem of the battery pack according to the comparative example.

FIG. 5A and FIG. 5B are views for illustrating a problem of a battery pack 100 according to a comparative example. In contrast with the battery pack 100 according to this comparative example, the effects of the battery pack 1 according to the embodiment will be described. The battery pack 100 is equipped with a battery case 102. The battery case 102 is formed in the same manner as the battery case 20, except that there is no fragile portion 24b1.

A curve C shown in FIG. 5A schematically represents how a lateral wall 104 deforms when a load is applied to the lateral wall 104 of the battery case 102 by a crushing element from a direction indicated by an arrow B in a crushing test. In concrete terms, the bending of the entirety of the lateral wall 104 as indicated by the curve C leads to the local application of the local to lateral surface portions of one of the battery stacks 10 (the battery cells 12). The reason for this is as follows. That is, the lateral wall 104 having no fragile portion 24b1 is uniform in wall surface rigidity. Therefore, the lateral wall 104 deforms as indicated by the curve C in FIG. 5A, and as a result, the lateral wall 104 deforms from a connection portion between the lateral wall 104 and a bottom wall 106 that is indicated through the use of a circle mark E in FIG. 5B. Consequently, the load is locally applied to the battery stack 10 (the battery cells 12).

In contrast, with the battery pack 1 according to the present embodiment, the lateral wall 24 of the battery case 20 includes the fragile portion 24b1 that is provided in the shape of the frame in such a manner as to cover the central portion 24a facing the battery stack 10, and that is lower in rigidity than the central portion 24a. Thus, when a load is applied from the outside by the crushing element, stress can be concentrated on the fragile portion 24b1. As a result, the fragile portion 24b1 provided in the shape of the frame fractures, and the load is applied from the outside with a wide range of the lateral wall 24 (i.e., the central portion 24a) in contact with the battery stack 10 (the battery cells 12). Therefore, the load can be restrained from being locally applied to the battery stack 10 (the battery cells 12). In other words, the load from the outside can be received through the use of the rigidity of the entirety of the battery cells 12.

Besides, in the present embodiment, the fragile portion 24b1 is "the recessed portion" formed in the shape of the frame in such a manner as to cover the central portion 24a. Thus, the load can be restrained from being locally applied to each of the battery stacks 10 (the battery cells 12) through the use of a simple structure without the need to add any separate member.

3. Modification Example

Figure 6A:
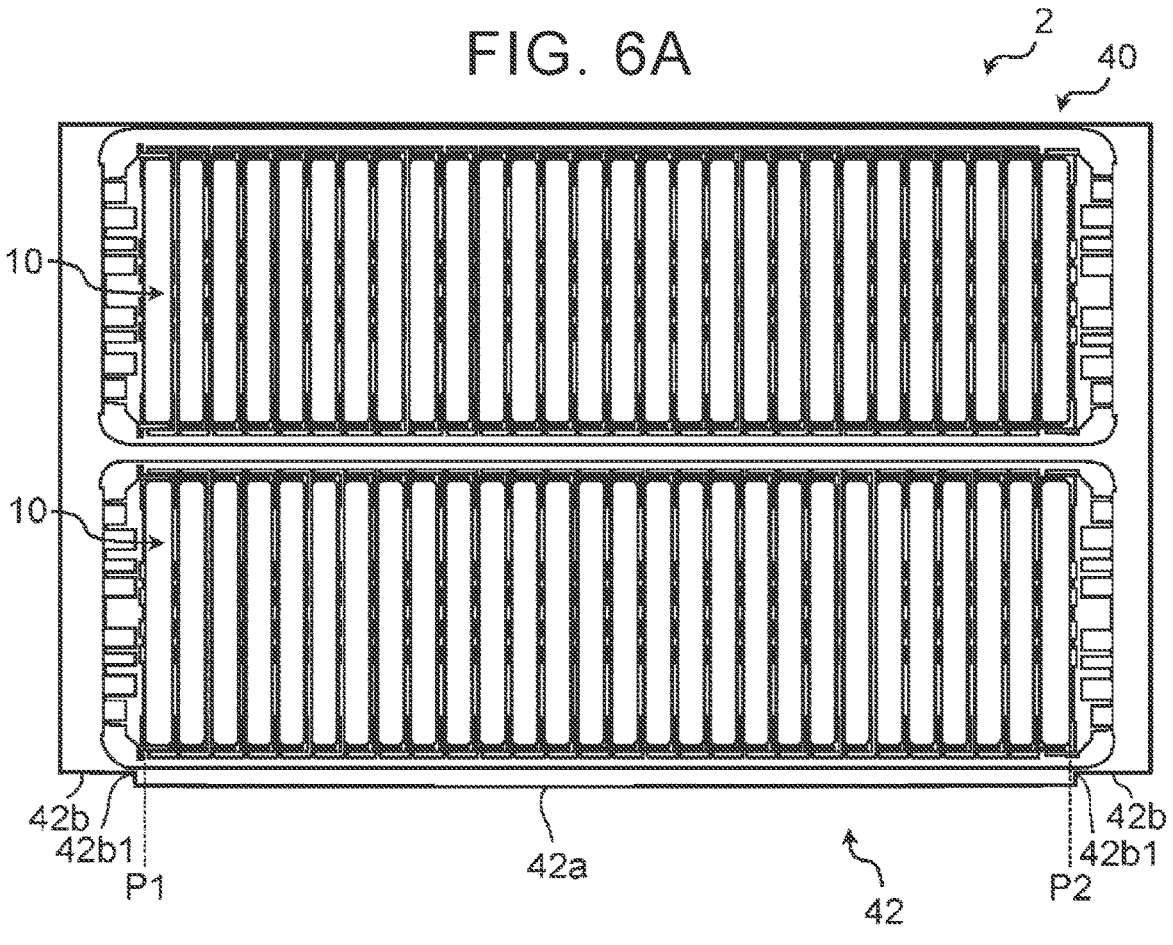
FIG. 6A is a view schematically showing the structure of a battery pack according to a modification example of the embodiment.
Figure 6B:
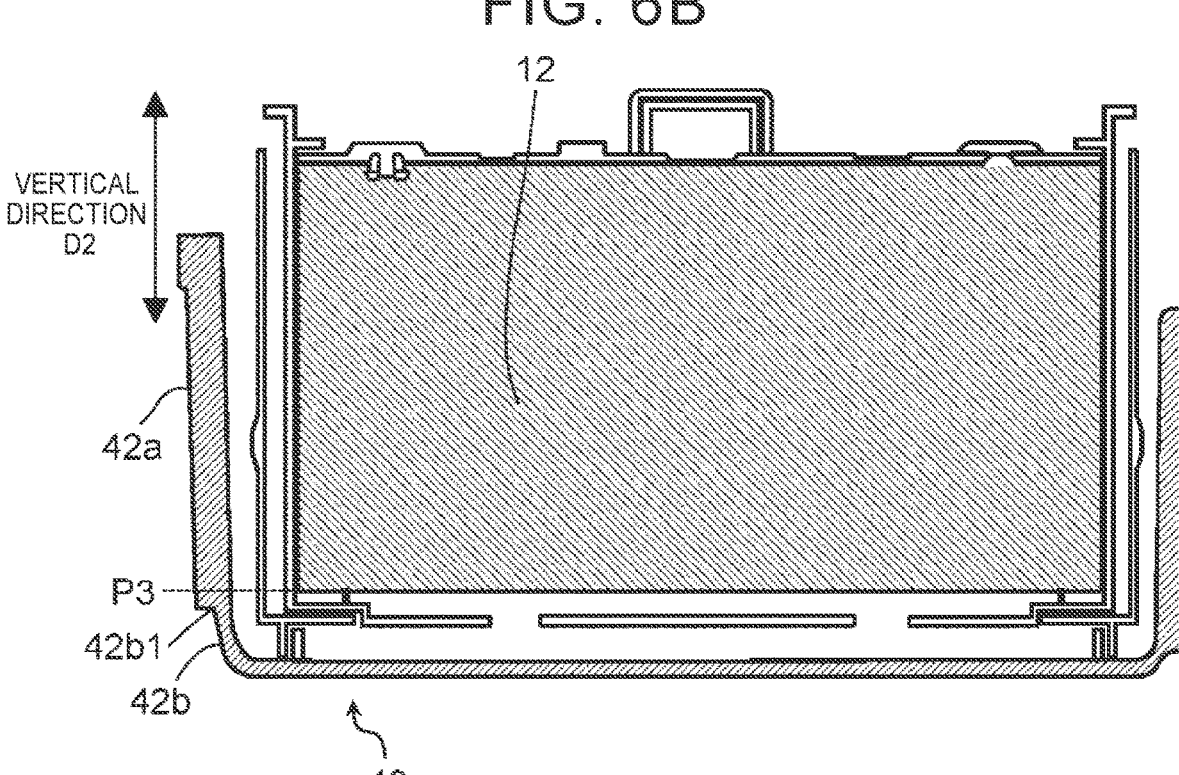
FIG. 6B is another view schematically showing the structure of the battery pack according to the modification example of the embodiment.

FIG. 6A and FIG. 6B are views schematically showing the structure of a battery pack 2 according to a modification example of the embodiment. The battery pack 2 according to this modification example is equipped with a battery case 40. The battery case 40 is different from the battery case 20 shown in FIG. 1 in the configuration of a fragile portion (i.e., a stress concentration portion).

In concrete terms, the battery case 40 includes a lateral wall 42. The lateral wall 42 includes a central portion 42a (a general surface) facing one of the battery stacks 10, and a peripheral portion 42b located around the central portion 42a. Moreover, the peripheral portion 42b includes a fragile portion 42b1. Incidentally, "the central portion" according to the present disclosure is a region facing the battery cells laminated on one another (i.e., the battery stack), but may not necessarily be the region facing the battery cells in the strict sense of the term, as long as the region facing the battery cells is included in the central portion. That is, as in the example of the central portion 42*a* shown in FIG. 6A and FIG. 6B, the central portion may include not only the region facing the cells but also a region around that region.

In addition, as shown in FIG. 6A and FIG. 6B, the central portion 42*a* is formed to be thicker than the peripheral portion 42*b*. Moreover, the fragile portion 42*b*1 corresponds to a step portion located between the central portion 42*a* and the peripheral portion 42*b*.

According to the battery case 40 configured as described above, the central portion 42*a* is made higher in rigidity than the peripheral portion 42*b*. Therefore, a difference in rigidity can be created between the central portion 42*a* and the fragile portion 42*b*1. Thus, when a load is applied to the lateral wall 42 from the outside in a crushing test, stress can be concentrated on the fragile portion 42*b*1 having the shape of a step. As a result, the fragile portion 42*b*1 provided in the shape of a frame fractures, and the load can be restrained from being locally applied to one of the battery stacks 10 (the battery cells 12).

By the way, in the foregoing embodiment, the fragile portion 24*b*1 (see FIG. 2) is provided only in one of the four lateral walls 24, 26, 28, and 30 of the battery case 20, namely, the lateral wall 24 parallel to the lamination direction D1 of the battery cells 12. However, "the fragile portion" according to the present disclosure may be provided in the same manner in the other lateral wall 28 parallel to the lamination direction D1, instead of or in addition to being provided in the lateral wall 24. Furthermore, the fragile portion 24*b*1 may be provided in the same manner in at least one of the lateral walls 26 and 30 extending along the direction perpendicular to the lamination direction D1, instead of or in addition to being provided in at least one of the lateral walls 24 and 28. Incidentally, this also holds true for the battery case 40 shown in FIG. 6A.

What is claimed is:

1. A battery pack comprising:
   a battery case that accommodates a plurality of battery cells laminated on one another, wherein
   the battery case includes a bottom wall that faces bottom surfaces of the battery cells, and four lateral walls that are connected to the bottom wall and that face lateral surfaces of the battery cells respectively,
   each of the four lateral walls includes a central portion that faces the battery cells, and a peripheral portion located around the central portion, and
   each of the four lateral walls includes a fragile portion that is smaller in thickness than the peripheral portion and is provided in a shape of a frame in such a manner as to cover the central portion between the central portion and the peripheral portion and that is lower in rigidity than the central portion, and the fragile portion in each of the four lateral walls includes a recessed portion that is U-shaped in a plane of its respective lateral wall.

2. The battery pack according to claim 1, wherein the fragile portion of at least one of four lateral walls is formed as a groove in an outer surface of the at least one of the four lateral walls.

3. The battery pack according to claim 1, wherein the recessed portion of at least one of four lateral walls is formed in an inner surface of the at least one of the four lateral walls.

4. The battery pack according to claim 1, further comprising the plurality of battery cells, and wherein the fragile portion of at least one of four lateral walls is outward of the plurality of battery cells in a lamination direction.

5. The battery pack according to claim 4, wherein the fragile portion of the at least one of four lateral walls is below the plurality of battery cells in a vertical direction.

6. A battery pack comprising:
   a battery case that accommodates a plurality of battery cells laminated on one another, wherein
   the battery case includes a bottom wall that faces bottom surfaces of the battery cells and four lateral walls that are connected to the bottom wall and that face lateral surfaces of the battery cells respectively,
   at least one of the four lateral walls includes a central portion that faces the battery cells, and a peripheral portion located around the central portion,
   the at least one of the four lateral walls includes a fragile portion that is smaller in thickness than the peripheral portion and is provided in a shape of a frame in such a manner as to cover the central portion between the central portion and the peripheral portion and that is lower in rigidity than the central portion, and the fragile portion is formed as a groove in an outer surface of the at least one of the four lateral walls, and
   each of the four lateral walls includes the fragile portion, and the fragile portion in each of the four lateral walls includes a recessed portion that is U-shaped in a plane of its respective lateral wall.

7. The battery pack according to claim 6, wherein the fragile portion is a recessed portion formed in the shape of the frame.

8. The battery pack according to claim 6, further comprising the plurality of battery cells, and wherein the fragile portion is outward of the plurality of battery cells in a lamination direction.

9. The battery pack according to claim 8, wherein the fragile portion is below the plurality of battery cells in a vertical direction.

* * * * *